United States Patent [19]
Carkhuff et al.
[11] Patent Number: 5,013,885
[45] Date of Patent: May 7, 1991

[54] PLASMA ARC TORCH HAVING EXTENDED NOZZLE OF SUBSTANTIALLY HOURGLASS

[75] Inventors: Donald W. Carkhuff; Jeffrey S. Everett, Florence; Jule Conner, Marion, all of S.C.

[73] Assignee: ESAB Welding Products, Inc., Florence, S.C.

[21] Appl. No.: 486,070

[22] Filed: Feb. 28, 1990

[51] Int. Cl.[5] .................... B23K 9/00
[52] U.S. Cl. .................... 219/121.5; 219/121.49; 219/121.51; 219/121.48; 219/75
[58] Field of Search .................... 219/121.5, 121.51, 121.52, 219/121.46, 121.39, 121.59, 74, 75, 121.49; 231/121.31, 121.41

[56] References Cited

U.S. PATENT DOCUMENTS

| | | | |
|---|---|---|---|
| D. 299,352 | 1/1989 | Spaulding et al. | 219/121.5 |
| 3,447,322 | 6/1969 | Mastrup | 219/121.5 |
| 4,521,666 | 6/1985 | Severance, Jr. et al. | 219/121.5 |
| 4,558,201 | 12/1985 | Hatch | 219/121.48 |
| 4,580,032 | 4/1986 | Carkhuff | 219/121.52 |
| 4,581,516 | 4/1986 | Hatch et al. | 219/121.5 |
| 4,716,269 | 12/1987 | Carkhuff | 219/121.5 |
| 4,748,312 | 5/1988 | Hatch et al. | 219/121.51 |
| 4,777,343 | 10/1988 | Goodwin | 219/121.49 |

*Primary Examiner*—M. H. Paschall
*Attorney, Agent, or Firm*—Bell, Seltzer, Park & Gibson

[57] ABSTRACT

A nozzle for use with a plasma arc torch having a first gas flow within the nozzle for engaging an electrode and generating a plasma and a second gas flow in surrounding engagement to the outer surface of the nozzle is disclosed. The nozzle includes an outer surface of substantially hourglass configuration in longitudinal cross-section so that the second gas remains in close contact with the outer hourglass surface of the nozzle to provide efficient heat transfer from the nozzle to the surrounding second gas flow.

17 Claims, 1 Drawing Sheet

PLASMA ARC TORCH HAVING EXTENDED NOZZLE OF SUBSTANTIALLY HOURGLASS

FIELD OF THE INVENTION

This invention relates to a plasma arc torch having a nozzle in surrounding, spaced relation to the discharge end of an electrode mounted in a torch head and extending forwardly through an outlet thereof and having a gas flow in surrounding engagement to the outer surface of the nozzle.

BACKGROUND OF THE INVENTION

In one type of plasma arc torch such as disclosed in U.S. Pat. Nos. 4,716,269; 4,581,516; and 4,580,032, an electrode is mounted in a torch head and includes a discharge end extending forwardly through and beyond an outlet of the torch head. A nozzle is positioned in surrounding spaced relation to at least the discharge end of the electrode. A first gas is supplied to the electrode and is ionized thereby to form a plasma. The plasma is discharged outwardly through an axial bore forming the discharge port of the nozzle. A second gas flows in surrounding engagement with the nozzle and provides not only cooling to the torch and work piece but a protective envelope for the plasma. During operation, a cooler work piece and torch can result in higher quality welds, cuts, and gouges.

It is believed that most prior art nozzles have a shortened cylindrical or conical shape with a taper converging toward the orifice of the nozzle. It has been determined that during operation of this type of torch, the desired amount of heat transfer from the nozzle to the cooling-stream has not occurred. This can result in overheating of the torch with a poor cut or weld quality. Additionally, the configuration of these prior art nozzles typically makes it difficult for an operator to guide the torch nozzle along a straight edge during cutting and allow the operator to cut in deep, narrow work areas.

It is therefore an object of this invention to provide a nozzle for a plasma arc torch which overcomes the aforementioned deficiencies of the prior art.

It is another object of this invention to provide a plasma arc torch of the type having a gas flow in surrounding engagement to the outer surface of the nozzle wherein the outer surface of the nozzle is configured so as to provide a surface on which the gas being discharged therealong can remain in close contact to provide an efficient heat transfer from the nozzle to the surrounding gas stream.

SUMMARY OF THE INVENTION

These and other objects of the present invention are accomplished by the use of a unique and novel nozzle used with a plasma arc torch of the type having a nozzle in surrounding relation with the discharge end of an electrode extending longitudinally along the axis of a torch head. A first gas flows within the nozzle for engaging the electrode and generating a plasma and a second gas flows in surrounding engagement to the outer surface of the nozzle for aiding in heat transfer from the nozzle.

The nozzle in accordance with the present invention comprises an elongate substantially cylindrical body member having an internal cavity defining a longitudinal axis. The nozzle includes a closed forward end portion and rear portion. An axial bore extends coaxially through the forward end portion of the body member and is aligned with the longitudinal axis for allowing plasma discharge therefrom. The outer nozzle surface is of substantially hourglass configuration in a longitudinal cross-section for providing a surface on which the gas being discharged therealong can remain in close contact to provide an efficient heat transfer from the nozzle and torch to the surrounding gas stream. The hourglass configured surface includes a rear converging conical surface and a forward diverging conical surface so as to define a concave portion at a medial location along its length.

BRIEF DESCRIPTION OF THE DRAWINGS

While some of the objects and advantages of this invention have been set forth above, other objects and advantages will appear as the description proceeds in conjunction with the attached drawings in which.

DETAILED DESCRIPTION OF THE PREFERRED EMBODIMENT

Figure 1:
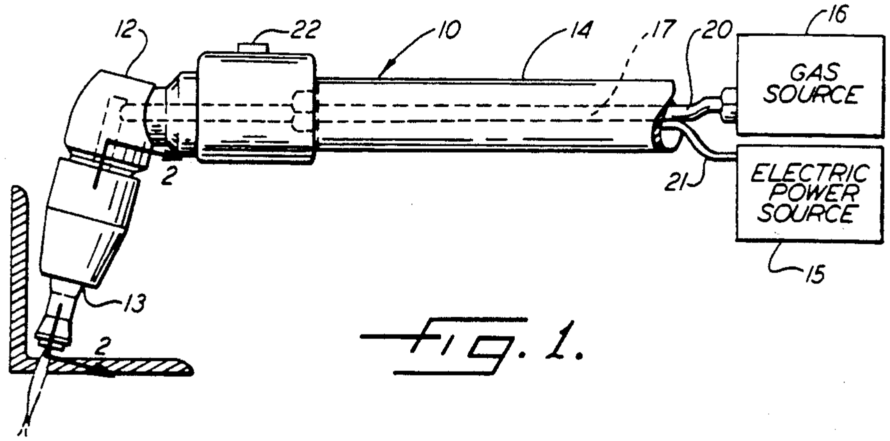
FIG. 1 is an elevational view of the plasma arc torch in accordance with the present invention.

Referring now to the drawings, FIG. 1 illustrates somewhat diagrammatically a plasma arc torch, generally indicated at 10 for cutting, welding, or gouging and having a nozzle assembly connected thereto in accordance with this invention. The plasma arc torch 10 includes a torch head 12, having an outlet 13 at one end, and torch handle 14, with the handle supporting the head at a fixed angle. Alternatively, the head 12 may extend from the handle 14 in a coaxial arrangement to form a pencil-like configuration (not shown).

The plasma arc torch 10 includes current supply means adapted to be connected to a main power supply 15 for supplying electric current to the torch head, and gas flow means adapted to be connected to a source of gas 16 for supplying a suitable gas such as compressed air to the torch head. As illustrated somewhat diagrammatically in FIG. 1, these means may comprise a tubular shank 17 extending from the handle 14 into the head 12 and being coupled with a gas conduit 20 from the gas source and a suitable electric conduit 21 from the main power supply. The tubular shank 17 may be a hollow copper tube or other electrically conductive material so as to pass an electric current to the head and provide for the flow of gas therethrough to the head. A switch 22 positioned on the handle 14 is interconnected to the current supply means and gas flow means to provide on-off control of the torch.

Figure 2:
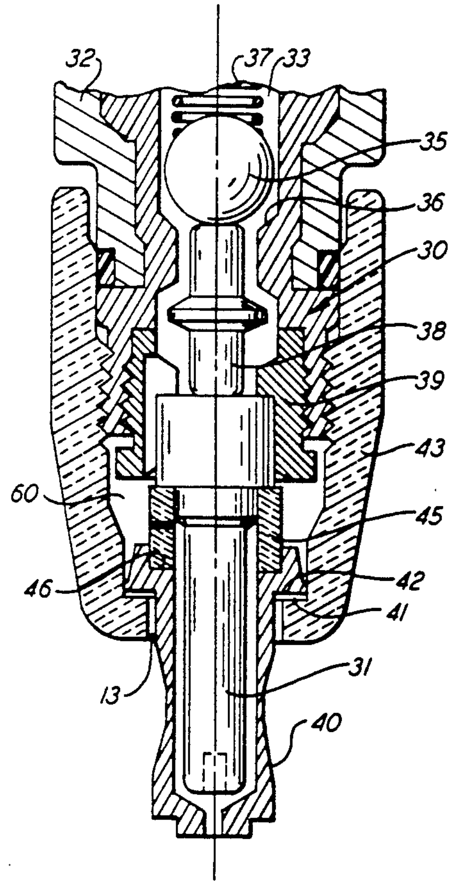
FIG. 2 is a cross-sectional view of the front part (torch head) of the plasma arc torch taken along line 2—2 of FIG. 1.

The plasma arc torch 10 further includes a current transfer assembly 30 (FIG. 2) for receiving and setting therewithin at least an upper portion of an electrode 31 which is mounted in the torch head and defines a longitudinal axis and a discharge end extending forwardly through and beyond said outlet 13 (FIG. 2). The assembly 30 prevents upward movement of the electrode in the torch head 12. The current transfer assembly 30 operatively connected to the power supply is for transferring current to the electrode 31. The current transfer assembly may include retaining members threadably coupled together (not shown in detail), as more fully described in U.S. Pat. No. 4,580,032, and is constructed of a conductive material, such as brass or the like. The current transfer assembly 30 is housed within a molded body portion 32. The tubular shank 17, comprising a portion of the current supply means and the gas supply means is brazed or otherwise connected to the current transfer assembly for the transfer of current thereto and communicates with a gas passageway 33 in the current transfer assembly 30 for providing a passageway for the flow of gas to the current transfer assembly.

As shown in FIG. 2, and as described in greater detail in U.S. Pat. No. 4,580,032, a safety ball valve assembly is provided in the passageway to shut-off the flow of gas when replacing the electrode in the in the torch. A non-conductive ball 35 of spherical geometry is mounted in the passageway 33 of a lower portion of the current transfer assembly 30. The ball 35 is mounted adjacent a valve seat 36 formed in the passageway. A compression spring 37 is mounted on one side of the ball 35 between the ball and a shoulder (not shown) of the current transfer assembly 30 to urge the ball 35 toward the valve seat 36. The ball 35 is lifted off the valve seat 36 by a plunger 38, which can be retained within the passageway by a collet 39 threadably coupled to the current transfer assembly 30. The plunger 38 engages the electrode and ball during normal operation of the torch.

The plasma arc torch further includes a nozzle assembly for receiving and seating a lower portion of the electrode 31 against downward movement in the torch head 12 and is operatively connected With the gas flow means for issuing a plasma arc outwardly from the torch head. This nozzle assembly includes a nozzle member 40 carried by a cooperating collar 41 and shoulder 42 on a heat shield 43 and nozzle member 40 respectively. The heat shield 43 is threadably coupled to the outside surface of the current transfer assembly 30 and overlaps the body portion 32 as shown in FIG. 2. The nozzle assembly further includes a ceramic swirl ring 45 carried by a collar 46 on the nozzle member 40. The nozzle member 40 preferably is formed of copper, or another electrically conductive material.

Figure 3:
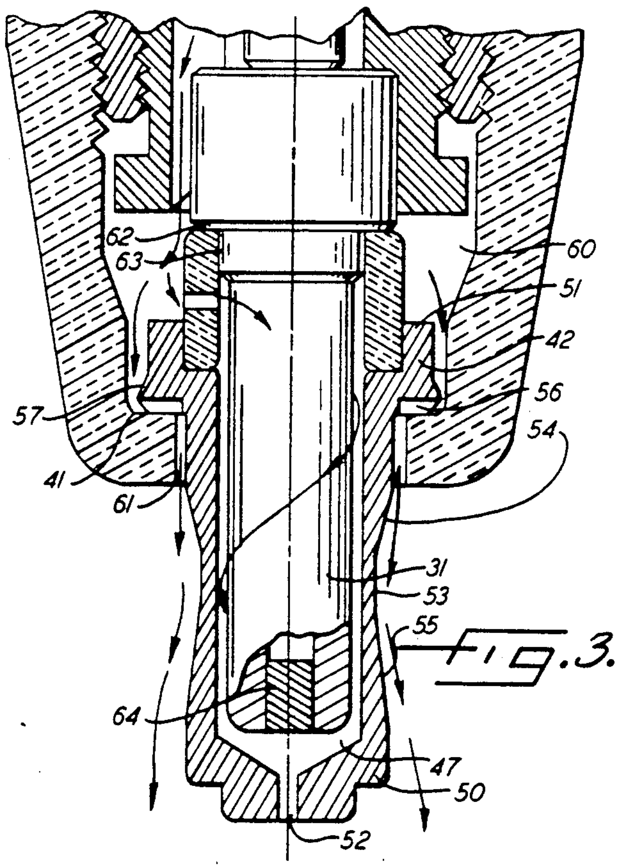
FIG. 3 is an enlarged cross-sectional view of the front part of the plasma arc torch shown in FIG. 2 and illustrating by arrows the first and second gas flows.
Figure 4:
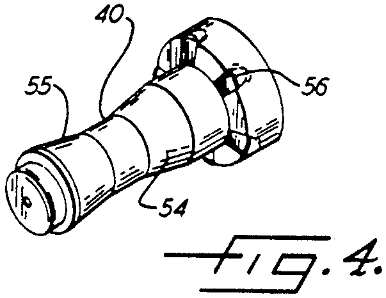
FIG. 4 is an isometric view of a nozzle in accordance with the present invention.

As best shown in FIGS. 3 and 4, the nozzle member 40 is an elongate, substantially cylindrical body having an internal cavity 47 defining a longitudinal axis. The nozzle member 40 extends outwardly in spaced relation to the outlet 13 and has a closed, stepped forward end portion 50 and open rear portion 51. An axial bore 52 extends coaxially through the forward end portion 50 and is aligned with the longitudinal axis and forms a plasma discharge port for allowing plasma discharge therefrom. The nozzle member 40 includes an outer surface 53 of substantially hourglass configuration in a longitudinal cross-section for providing a surface on which a gas being discharged therealong can remain in close contact to provide an efficient heat transfer from the nozzle member 40 and torch to the surrounding gas stream. The hourglass configured outer surface 53 has a length greater than the width thereof and includes a converging rear conical surface 54 and a forward diverging conical surface 55 to define a reduced diameter portion at a medial location along its length. The forward diverging conical surface 55 defines an angular inclination of about 4° to 14° and preferably about 7° with respect to the longitudinal axis. The rear converging conical surface 54 defines an angular inclination of about 10° to 20° and preferably about 13° with respect to a longitudinal axis. A plurality of gas discharge slots 56 are formed on the undersurface of the shoulder 42 and extend outwardly therefrom. The slots 56 are formed by means such as swaging so that a concave surface is formed which also forms a protuberance along the shoulder periphery of the nozzle member which can aid in spacing the nozzle from the interior of the heat shield.

With this construction, a gas passageway in the form of a chamber 60 is formed within the heat shield 43 and around the swirl ring 45 and nozzle member 40 to receive flowing gas from the current transfer assembly 30, as indicated by the arrows in FIG. 3. The swirl ring 45 is provided with apertures to receive flowing gas therethrough to the interior of the nozzle. A second gas passageway 13 is formed between the nozzle member 40 and the shield 43.

As illustrated in FIG. 3, the electrode 31 is an elongate member dimensioned to fit within the nozzle in a close clearance fit so that an annular passageway 61 is formed between the electrode 31 and the interior of the nozzle member 40. The upper portion of the electrode 31 includes an upper enlarged portion having a shoulder 62 and collar 63 dimensioned so that the electrode can rest on the swirl ring 45. The upper enlarged portion of the electrode is received within the lower portion of the current transfer assembly 30. The plunger 38 engages the ball 35 and top surface of the electrode as illustrated in FIG. 2. The upper surface of the electrode 31 seats against the current transfer assembly 30 and prevents upward movement in the torch head 12 of the electrode. The electrode typically is formed of copper and includes a generally cylindrical emissive insert 64 disposed coaxially along the longitudinal axis. The emissive insert is composed of metallic material having a relatively low work function so as to be adapted to emit electrons upon an electric potential being applied thereto.

METHOD OF OPERATION

Gas, such as compressed air, initially is supplied by gas flow means to the torch head. The gas flows within the current transfer assembly 30 and around the upper enlarged portion of the electrode and into the chamber 60 as shown in FIG. 3. A portion of the gas flows through the swirl ring 45 and around the electrode 31 outward through the discharge port 52 of the nozzle. A remaining portion of the gas flows through the slots 56 on the undersurface of the nozzle shoulder 42 and outward through the outlet 13 into engagement with the hourglass configured outer surface 53 of the nozzle.

The torch head 12 then is energized so that current is transferred from the current transfer assembly 30 to the electrode. An electrical arc, which can include an initial pilot arc, is combined with the gas flow in the nozzle member 40 to form the plasma arc between the electrode and the work being cut, welded, or gouged in a manner well understood by those with ordinary skill in the art.

The remaining second gas portion flowing outwardly from the outlet 13 engages the nozzle and remains in close contact with the hourglass configured outer surface 53 to provide an efficient heat transfer from the nozzle to the surrounding gas stream. This results in an increased cooling efficiency of the electrode 31 and nozzle member 40 to prevent the nozzle from overheating. During normal operation, any attempt to remove the heat shield 43 from the torch body 32 so as to remove the nozzle member 40 and electrode 31 therefrom will cause the ball 35 to seat itself against the valve seat 36 which, in turn, closes off the flow of plasma gas. By appropriate means (not shown) the termination of the gas flow can de-energize the main power supply to the torch. Additionally, if the heat shield 43 is not properly fixed on the torch body 32, no gas and current will flow to the current transfer assembly 30.

The extended nozzle having a substantially hourglass configuration offers several benefits in accordance with the present invention. Any gas discharged along the hourglass surface remains in close contact therewith to provide an efficient heat transfer from the nozzle and torch to the surrounding gas stream. During torch operation, there is less danger that the nozzle and torch will overheat thus creating a poor weld, cut, or gouge quality. Additionally, the configuration of the hourglass configured nozzle provides an elongate nozzle member which is adapted to provide cutting in relatively deep, narrow work areas and along narrow joints such as disclosed in FIG. 1. Additionally, the elongate nozzle can be placed against a straight edge to provide straighter cutting during operation.

In the drawings and specification there has been set forth a preferred embodiment of this invention, and although specific terms are employed, they are used in a generic and descriptive sense only and not for purposes for limitation, the scope of the invention being defined in the following claims.

That which is claimed is:

1. A nozzle adapted for use with a plasma arc torch of the type having a nozzle in surrounding relation with the discharge end of an electrode extending longitudinally along the axis of a torch head, and having a first gas flow within the nozzle for engaging the electrode and generating a plasma and a second gas flow in surrounding engagement to the outer surface of the nozzle for aiding in heat transfer from the nozzle and torch, said nozzle comprising (a) an elongate substantially cylindrical body member having an internal cavity defining a longitudinal axis, and having a closed forward end portion and open rear portion, (b) an axial bore extending coaxially through the forward end portion of the body member and aligned with said longitudinal axis for allowing plasma discharge therefrom, and (c) an outer surface having a converging rear conical surface and forward diverging conical surface to define a reduced diameter portion at a medial location along its length so that said nozzle is of substantially hourglass configuration in longitudinal cross-section for providing a surface on which a gas being discharged therealong can remain in close contact to provide an efficient heat transfer from the nozzle and torch to the surrounding gas stream.

2. A nozzle according to claim 1 including a shoulder extending outwardly from the rear portion thereof adapted for supporting the nozzle in a torch head.

3. A nozzle according to claim 1 wherein the length of said hourglass configured outer surface is greater than the width thereof.

4. A nozzle according to claim 1 wherein said forward diverging conical surface defines an angular inclination of about 4° to 14° with respect to said longitudinal axis, and said rear converging conical surface defines an angular inclination of about 10° to 20° with respect to said longitudinal axis.

5. A cutting nozzle according to claim 1 wherein said body member is formed of copper.

6. A plasma arc torch which is characterized by a more rapid heat transfer for cooling the torch and which provides cutting in relatively deep, narrow work areas comprising (a) a torch head having an outlet at one end thereof, (b) an electrode mounted in said torch head and defining a longitudinal axis and a discharge end extending forwardly through and beyond said outlet, (c) an elongate nozzle in surrounding, spaced relation to said discharge end of said electrode to define an annular gas passageway between said electrode and nozzle, said nozzle extending forwardly from said outlet and having an outer surface with a converging rear conical surface and a forward diverging conical surface to define a reduced diameter portion at a medial location along its length so that said nozzle is of substantially hourglass configuration in longitudinal cross-section and a closed forward end portion which includes an axial bore substantially aligned with said longitudinal axis to define a plasma discharge port, and (d) means for supplying a first gas flow into said annular gas passageway for generating a plasma and for supplying a second gas flow into surrounding engagement with the outer surface of said nozzle wherein said second gas flow remains in close contact with the outer hourglass surface of said nozzle to provide efficient heat transfer from the nozzle to the surrounding second gas flow to aid in cooling the nozzle and torch during operation thereof.

7. A plasma arc torch according to claim 6 wherein said torch head includes an inner support ledge adjacent said outlet and said nozzle includes an upper, rear portion having a shoulder engaging said support ledge for supporting said nozzle thereat.

8. A plasma arc torch according to claim 6 wherein the length of said hourglass configured outer surface is greater than the width thereof.

9. A plasma arc torch according to claim 6 wherein said forward diverging conical surface defines an angular inclination of about 4° to 14° with respect to said longitudinal axis, and said rear converging conical surface defines an angular inclination of about 10° to 20° with respect to said longitudinal axis.

10. A plasma arc torch according to claim 6 wherein said nozzle is formed of copper.

11. A plasma arc torch according to claim 6 wherein said electrode includes a generally cylindrical emissive insert disposed coaxially along said longitudinal axis, said emissive insert being composed of a metallic material having a relatively low work function so as to be adapted to readily emit electrons upon an electric potential being applied thereto.

12. A plasma arc torch which is characterized by a more rapid heat transfer for cooling the torch and which provides cutting in relatively deep, narrow work areas comprising (a) a torch head having a chamber and an outlet at one end thereof communicating with said chamber, (b) an electrode mounted within said torch head and chamber and defining a longitudinal axis and a discharge end extending forwardly through and beyond said outlet, (c) an elongate nozzle supported by said torch head and extending outwardly from said outlet and in spaced relation thereto and in surrounding spaced relation to the discharge end of said electrode so as to form an annular first gas passageway between said nozzle and electrode and a second gas passageway communicating with said chamber and defined between said cutting nozzle and torch head outlet, said nozzle extending forwardly from said outlet and having an outer surface with a converging rear conical surface and a forward diverging conical surface to define a reduced diameter portion at a medial location along its length so that said nozzle is of substantially hourglass configuration in longitudinal cross-section and a closed forward end portion which includes an axial bore substantially aligned with said longitudinal axis to define a plasma discharge port, (d) gas supply means communicating with said chamber for supplying a gas therein, and (e) an annular swirl ring positioned in said chamber above said nozzle and in engagement therewith, said swirl ring defining an upper portion of said first gas passageway, said swirl ring including at least one aperture communicating with said chamber and said first gas passageway to provide a gas port for allowing gas flow from said chamber into said first gas passageway adjacent said electrode for generating a plasma, wherein the remaining gas flowing into said second gas passageway is discharged therefrom and remains in close contact with the outer hourglass surface of said nozzle to provide efficient heat transfer from the nozzle to the surrounding second gas flow to aid in cooling the nozzle and torch during operation thereof.

13. A torch as claimed in claim 12 wherein said torch head outlet includes an inner support ledge, and said nozzle includes an upper, rear portion having a shoulder engaging said outlet support ledge for supporting said nozzle thereat, said shoulder including a plurality of slots extending along the undersurface of said shoulder to provide a gas passage from said chamber into said second gas passageway defined between said nozzle and outlet.

14. A plasma arc torch according to claim 12 wherein the length of said outer hourglass surface is greater than the width thereof.

15. A plasma arc torch according to claim 12 wherein said forward diverging conical surface defines an angular inclination of about 4° to 14° with respect to said longitudinal axis, and said rear converging conical surface defines an angular inclination of about 10° to 20° with respect to said longitudinal axis.

16. A plasma arc torch according to claim 12 wherein said nozzle is copper.

17. A plasma arc torch according to claim 12 wherein said electrode includes a generally cylindrical emissive insert disposed coaxially along said longitudinal axis, said emissive insert being composed of a metallic material having a relatively low work function so as to be adapted to readily emit electrons upon an electric potential being applied thereto.

* * * * *

UNITED STATES PATENT AND TRADEMARK OFFICE
CERTIFICATE OF CORRECTION

PATENT NO. : 5,013,885

DATED : May 7, 1991

INVENTOR(S) : Donald W. Carkhuff, et al.

It is certified that error appears in the above-identified patent and that said Letters Patent is hereby corrected as shown below:

On the title page: Item [54]

After the word "HOURGLASS" insert -- CONFIGURATION --.

Column 3, line 34, "With" should be -- with --.

Signed and Sealed this

Twenty-sixth Day of January, 1993

*Attest:*

DOUGLAS B. COMER

*Attesting Officer*

*Acting Commissioner of Patents and Trademarks*